US008461742B2

(12) United States Patent
KN et al.

(10) Patent No.: US 8,461,742 B2
(45) Date of Patent: Jun. 11, 2013

(54) SUPPORT SYSTEM FOR DYNAMOELECTRIC MACHINE

(75) Inventors: Jayashankar KN, Karnataka (IN); Sanjeev Kumar Jha, Karnataka (IN); Shravan Kumar Bhagavatula, Karnataka (IN); Santhosh Kumar Kompally, Karnataka (IN)

(73) Assignee: General Electric Company, Schenectady, NY (US)

( * ) Notice: Subject to any disclaimer, the term of this patent is extended or adjusted under 35 U.S.C. 154(b) by 313 days.

(21) Appl. No.: 12/949,926

(22) Filed: Nov. 19, 2010

(65) Prior Publication Data

US 2012/0126649 A1 May 24, 2012

(51) Int. Cl.
*H02K 3/46* (2006.01)
(52) U.S. Cl.
USPC ............................................ 310/260; 310/270
(58) Field of Classification Search
USPC .................... 310/260, 270, 267, 271
See application file for complete search history.

(56) References Cited

U.S. PATENT DOCUMENTS

| 3,089,048 | A | | 5/1963 | Bahn et al. | |
|---|---|---|---|---|---|
| RE28,478 | E | | 7/1975 | Bahn et al. | |
| 3,991,334 | A | | 11/1976 | Cooper et al. | |
| 4,254,352 | A | * | 3/1981 | Fidei et al. ........................ 310/71 |
| 4,488,079 | A | | 12/1984 | Dailey et al. | |
| 4,501,985 | A | | 2/1985 | Dobson et al. | |
| 4,943,749 | A | * | 7/1990 | Ponce et al. ................... 310/260 |
| 5,436,520 | A | * | 7/1995 | Huber ............................. 310/260 |
| 5,485,050 | A | * | 1/1996 | Zimmermann ............... 310/260 |
| 2006/0181165 | A1 | | 8/2006 | Baenziger et al. | |
| 2007/0170793 | A1 | * | 7/2007 | Baenziger et al. ............. 310/71 |

FOREIGN PATENT DOCUMENTS

| GB | 961048 A | 6/1964 |
|---|---|---|
| JP | 08280149 A | 10/1996 |
| SU | 1390711 A1 | 4/1988 |

OTHER PUBLICATIONS

Search Report issued in connection with GB Patent Application No. 1119706.8, Mar. 9, 2012.

\* cited by examiner

*Primary Examiner* — Nguyen N Hanh
(74) *Attorney, Agent, or Firm* — James W. Pemrick; Ernest G. Cusick; Frank A. Landgraff

(57) ABSTRACT

A connection ring assembly and connection ring support system for a dynamoelectric machine is provided. The connection ring assembly includes a plurality of connection rings, and a clamp element disposed around a portion of the connection rings. The clamp element provides axial and tangential support to the plurality of connection rings. The connection ring support system includes one or more primary spring bars connected to the connection ring assembly. The primary spring bars permit radial and tangential movement of the connection ring assembly. One or more secondary spring bars are connected to the primary spring bars, and permit axial movement of the connection ring assembly.

19 Claims, 7 Drawing Sheets

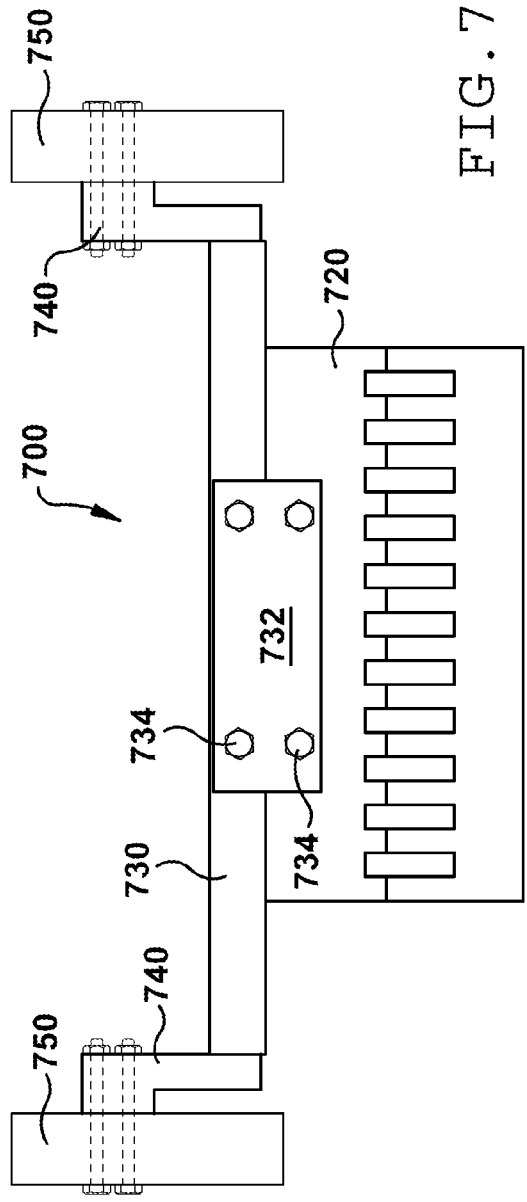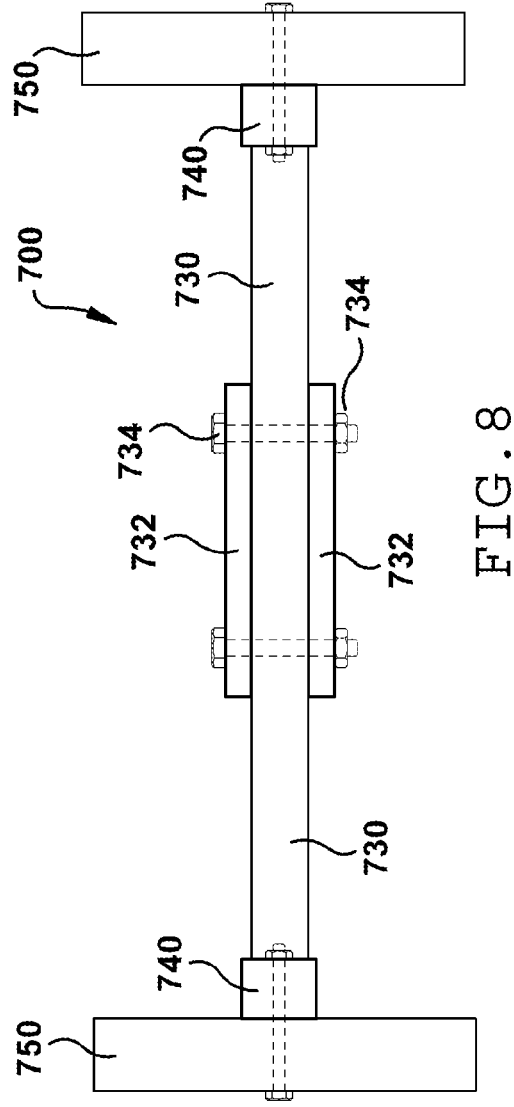

SUPPORT SYSTEM FOR DYNAMOELECTRIC MACHINE

BACKGROUND OF THE INVENTION

This invention relates to an improved support system for the conducting members of the stator of a dynamoelectric machine and more particularly it relates to a connection ring support system for a generator which is free to move axially as the stator windings thermally expand and contract.

The end turns of a dynamoelectric machine stator are the projecting portions of the armature bars that extend outwardly from longitudinal stator slots. The end turns are necessary in order to reverse the direction of the armature bar and to circumferentially displace the end of the bar so that it can enter a slot almost 180 degrees from the slot from which it emerged. The end turns must also diverge radially from the stator axis in order that they will not obstruct the rotor of the dynamoelectric machine that is turning in the stator bore. Consequently, the stator end turns assume a rather complicated configuration in that they are skewed with respect to the stator axis and lie generally tangentially about a frusto-conical surface of revolution concentric with the stator axis. When there are two separate armature bars in each slot, these being known as "top" (radially inner) and "bottom" (radially outer) bars, one practice is to bend the top bars so that they lie tangentially in one direction about this frusto-conical surface and to bend the bottom bars in the opposite tangential direction about the surface of revolution. The matter is further complicated by the fact that, although the top and bottom bars are closely adjacent at the location where they emerge from the slot, they must spread radially with respect to one another as they move away from the stator so that space will be afforded for a series loop connecting a top bar to a bottom bar.

With this background in mind, it will be appreciated that there are many difficulties in devising a suitable structure for supporting the insulated armature bars in the end turn region. The problem has become more acute with the advent of higher operational temperatures in machines, resulting in longer thermal expansion of the stator bars and the associated stresses of this thermal expansion in the structure. Substantial heat is generated by the passage of electric current through the armature bars and, even though effective gas or liquid cooling of the bars is provided, the thermal expansion and contraction of the bars with respect to the stator slots containing them will tend to move the end turns apart in an axial direction with respect to the longitudinal center of the stator.

One support method which has been used extensively to give the strength, yet the yieldability, required of an end winding support system has been to lash the projecting armature bars to a series of circumferential support "hoops." With this method, each bar is individually tied to a circumferential hoop with a strong flexible cord, such as glass cord impregnated with an adhesive such as epoxy resin. In a typical construction, there may be upwards of 72 (or more) top bars and bottom bars to be lashed to the circumferential hoops in the structure at either end of the stator.

In addition to separately securing the armature bars to a support structure with the foregoing method, they must be separated and secured with respect to one another. One method for accomplishing this is to use spacer blocks that conform to the space and are lashed to the armature bars. Connection rings are typically blocked in a similar fashion and tied using adhesive impregnated glass ties to ensure structural rigidity in the axial direction.

In many support structures the connection rings are securely attached to the stator frame and cannot move relative to the stator winding as it thermally grows. This can result in distortion of the electrical connection between the connection rings and the stator bars, or excessive forces being applied to the blocking components. This distortion/force can cause damage to the stator winding over the long-term operation of the machine.

The number of connection rings has increased in high output machines as the number of circuits has increased from one to two and now three or more winding circuits are used in the machine. This increases the banks of rings in the machine and makes installation of the rings more time consuming and more difficult to secure the rings and associated blocking because access to the components is more difficult as the number of banks of rings increases.

BRIEF DESCRIPTION OF THE INVENTION

In an aspect of the present invention, a connection ring assembly for a dynamoelectric machine is provided. The connection ring assembly includes a plurality of connection rings, and a clamp element disposed around a portion of the connection rings. The clamp element provides axial and tangential support to the plurality of connection rings.

In another aspect of the present invention, a connection ring support system is provided for a dynamoelectric machine. The connection ring support system includes one or more primary spring bars connected to the connection ring assembly. The primary spring bars permit radial and tangential movement of the connection ring assembly. One or more secondary spring bars are connected to the primary spring bars, and permit axial movement of the connection ring assembly.

BRIEF DESCRIPTION OF THE DRAWINGS

FIG. 7 illustrates a cross-sectional view of a connection ring support system, according to an aspect of the present invention;

FIG. 8 illustrates a top view of a connection ring support system, according to an aspect of the present invention.

DETAILED DESCRIPTION OF THE INVENTION

Figure 1:
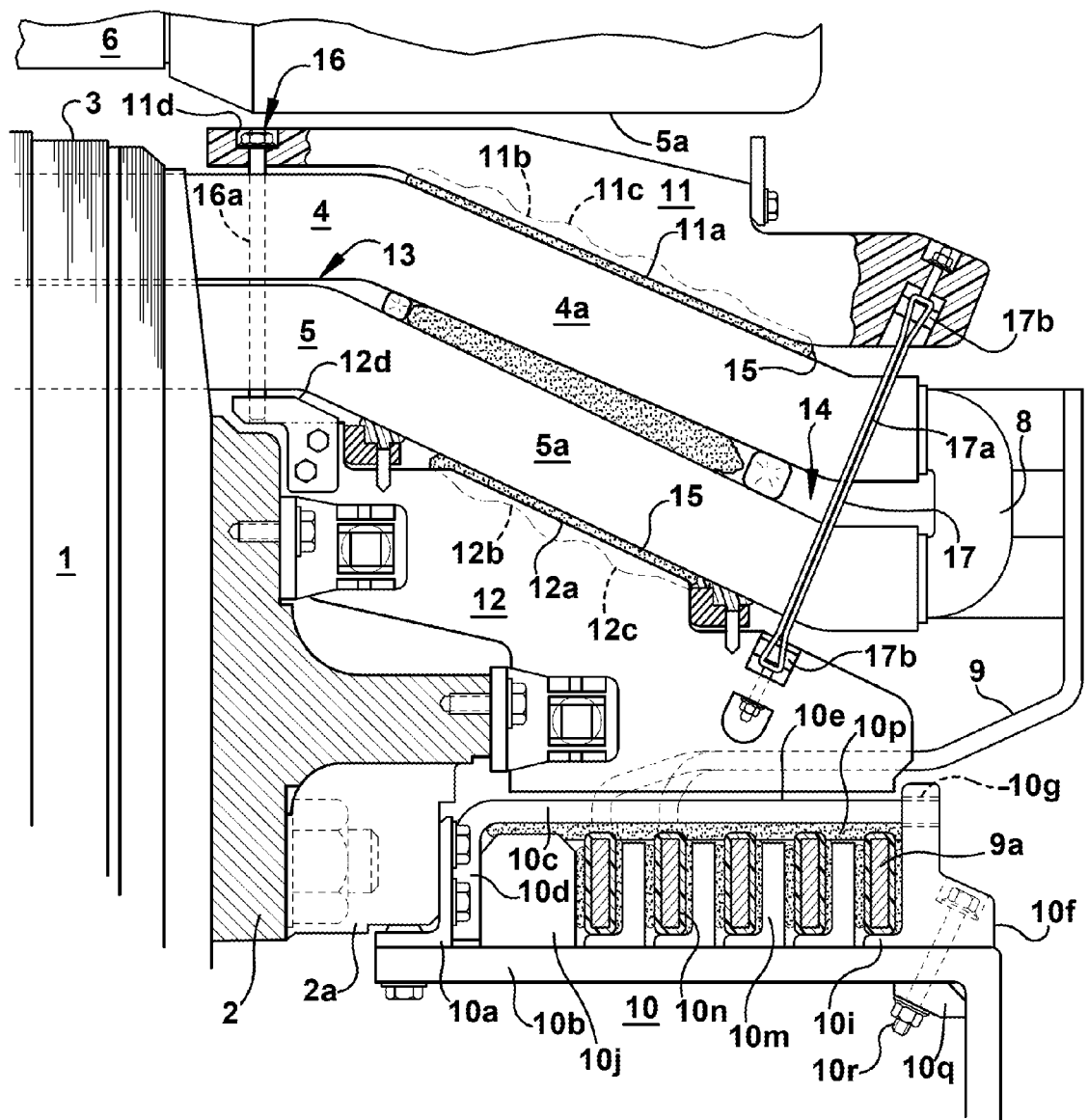
FIG. 1 is a horizontal elevation illustration, partly in section, of one known support system at one end of a generator.

Referring now to FIG. 1, a horizontal elevation view, of one known dynamoelectric machine, is shown of a portion of a stator 1 which includes a circumferential flange ring 2. The rotor 6 turns in bore 3 shown near the top of FIG. 1. The main structural members of the stator 1 including the flange ring 2 and other support members (not shown) enclose and support a large number of slotted core laminations defining the stator central bore 3 and through which pass the slot-lying portions of top armature bars 4 and bottom armature bars 5. Top bars 4 bend both circumferentially and radially as they come out of the slot and continue in an involute curve as shown at 4a. Similarly, bottom bars 5 also diverge radially but in an opposite circumferential sense as seen at 5a. Thus these portions 4a and 5a are both "skewed" with respect to the stator axis, and are bent in an involute-type configuration so as to lie tangentially to a frusto-conical surface of revolution taken about the stator axis.

The generator rotor 6 rotates in bore 3 of the stator 1. A top bar on one side of the stator circumference is connected with a bottom bar approximately diametrically opposite, this connection being made with a "series loop" 8. It will be understood that series loop 8 is rotated into the plane of the drawing in FIG. 1 in order to show the proper spacing of the members in a radial direction and that it does not actually connect the portions 4a and 5a emerging from the same slot.

At intervals about the stator circumference, power is withdrawn from the armature windings through leads 9 passing to circumferential connection rings 9a. Connection rings 9a, in turn, are connected to the high voltage outlet terminals (not shown). The support structure holding connection rings 9a in position is shown generally at 10. Several such connection ring support structures 10 are circumferentially spaced about the stator outside of the end turns and are attached to circumferential flange 2 by bolting to radial webs 2a made integral with the circumferential flange 2.

The connection ring support structure is supported by means of a flanged member 10a, the under side of which is rigidly bolted to an axially extending lower member 10b. An upper angle piece shown generally at 10e has a short leg 10d abutting the face of member 10a to prevent its movement toward the stator and a long leg 10e passing over the connection rings 9a and substantially parallel with lower member 10b. The long leg 10e is supported in a support 10f by means of a hole 10g receiving the end of long leg 10e. Support 10i is mounted to lower member 10b.

Turning now to the support system for the armature end windings, the top bar extending portions 4a and the bottom bar extending portions 5a are held by inner support members 11 and outer support members 12. These inner and outer support members 11, 12 are circumferentially spaced about the stator bore and extend generally axially and radially outward therefrom. Thus members 11, 12 are disposed substantially coplanar with the stator axis. Inner support members 11 define support surfaces 11a which lie parallel to the frusto-conical surface of revolution, i.e. each surface 11a of an inner support member 11 diverges as the element of a cone from the stator axis while the bar portions 4a cross it diagonally. Similarly, the outer support members 12 define support surfaces 12a, which also diverge as elements of a cone from the stator axis while bar portions 5a cross it diagonally. Surfaces 11a, 12a are not exactly parallel but must diverge radially from one another slightly so as to allow for the fact that the radial spacing between top and bottom bars near the slot, as shown at 13, is less than the radial spacing between top bar 4 and bottom bar 5 at the series loop, as shown at 14.

Surfaces 11a, 12a of support members 11, 12 are furnished with longitudinal grooves 11b, 12b respectively. Disposed in grooves 11b, 12b and extending above surfaces 11a, 12a are elongated pads of thermosetting resin 15, which are placed in the grooves during assembly in an uncured or pliable state. Inner and outer support members 11, 12 are securely fastened to one another by tension members illustrated by a bolt 16 and an insulating tension member 17. Member 17 consists of a glass rope tie 17a secured to T-shaped adjustable bolts 17b.

However, these glass ties tend to work loose thereby increasing the loads on the connection rings.

The connection rings of a generator or motor end winding experience severe thermal loads due to expansion and contraction of stator bars. Differential thermal expansion of connection rings due to their layout also introduces relative displacements across the connection rings. It would be beneficial to provide axial, radial and tangential stiffness to the connection ring blockings to withstand thermal and vibratory loads. Aspects of the present invention provide axial stiffness to the connection ring assembly by using a clamping arrangement.

Figure 2:
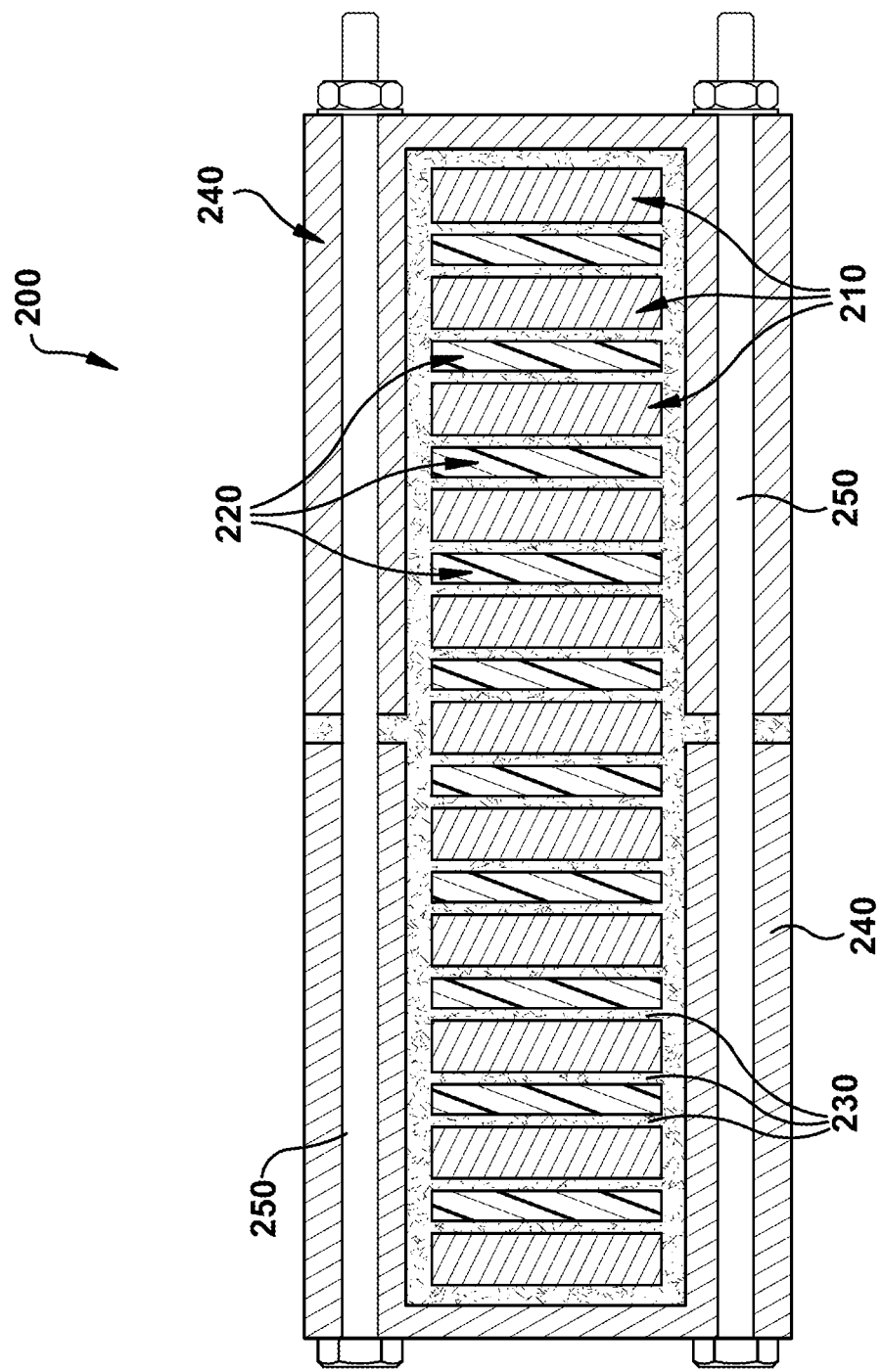
FIG. 2 is a cross-sectional illustration of an improved connection ring assembly, according to an aspect of the present invention.

FIG. 2 illustrates a cross-sectional view of a connection ring assembly 200 that includes connection rings 210, blocking 220 between adjacent connection rings 210, sacrificing material 230, clamp elements 240 and bolting mechanism 250. The blocking 220 can be comprised of a felt, felt-textolite, rubber, elastomer, fibrous material or any other suitable material. The sacrificing material could be felt, felt-textolite, rubber, elastomer, fibrous material or any other suitable material. The two clamp elements 240 are generally C-shaped and are clamped together with mechanical fastening system (e.g., a bolt and nut arrangement). Only two bolts/nuts are shown, but it is to be understood that any suitable number of appropriate fasteners, or other fastening system, can be employed to clamp the two clamp elements 240 together. In previous known approaches, glass ties were used to secure the connection rings, and these glass ties tended to work loose which resulted in increasing loads on the connection ring interface. The connection ring assembly 200 including clamp elements 240 of the present invention, provide axial and tangential support and stiffness, which reduces the increasing loads problem associated with glass ties.

Figure 3:
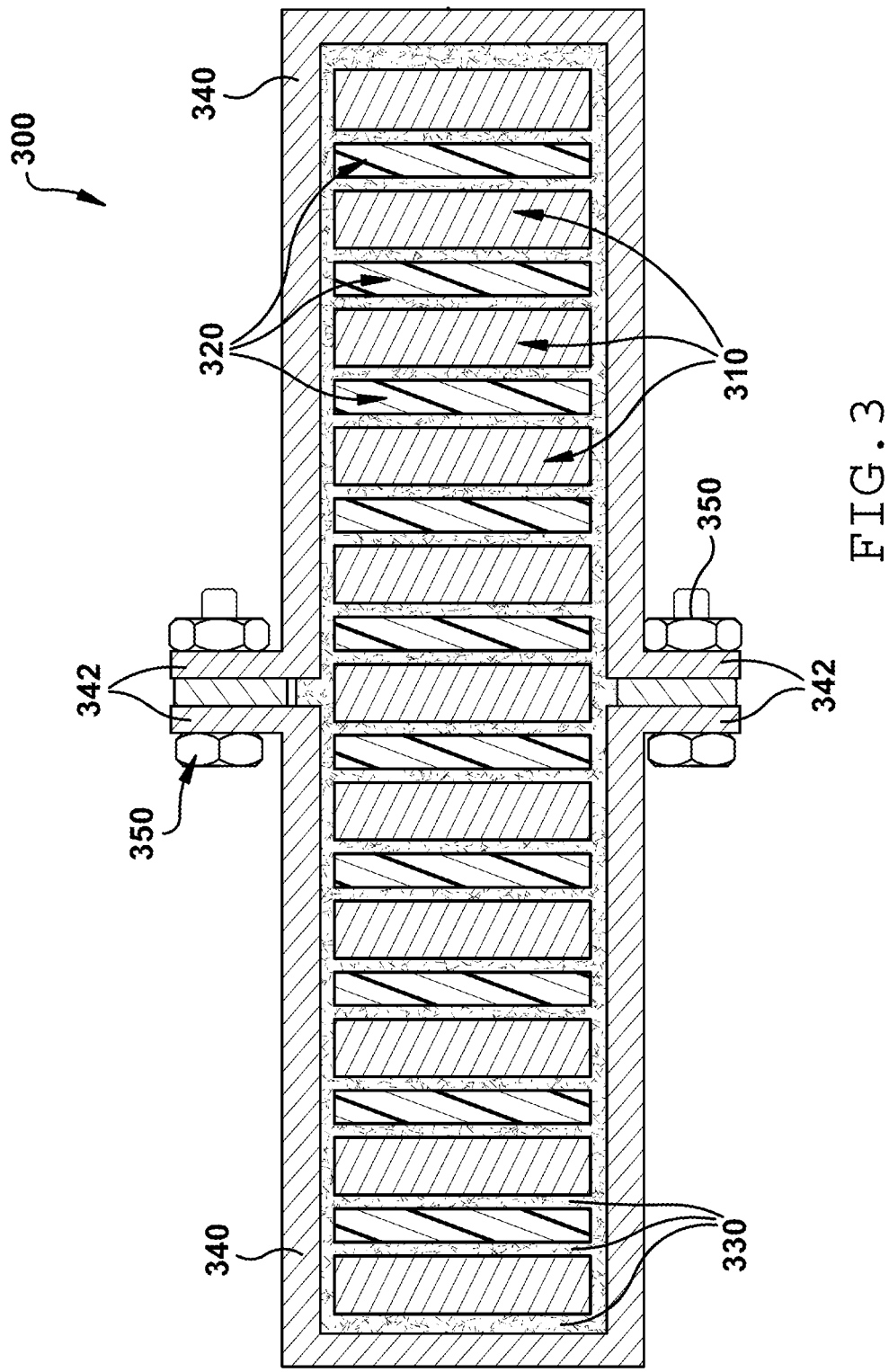
FIG. 3 is a cross-sectional illustration of an improved connection ring assembly, according to an aspect of the present invention.

FIG. 3 illustrates a cross-sectional view of a connection ring assembly 300 that includes connection rings 310, blocking 320 between adjacent connection rings 310, sacrificing material 330, clamp elements 340 and bolting mechanism 350. The blocking 320 can be comprised of a felt, felt-textolite, rubber, elastomer, fibrous material or any other suitable material. The sacrificing material 330 could be felt, felt-textolite, rubber, elastomer, fibrous material or any other suitable material. The two clamp elements 340 are generally C-shaped and have flanges 342 that are clamped together with a mechanical fastening system 350 (e.g., a bolt and nut arrangement). Only two bolts/nuts are shown, but it is to be understood that any suitable number of appropriate fasteners can be employed to clamp the two clamp elements 340 and their respective flanges 342 together. The connection ring assembly 300 of the present invention, provides axial and tangential stiffness, which reduces the increasing loads problem associated with glass ties.

Figure 4:
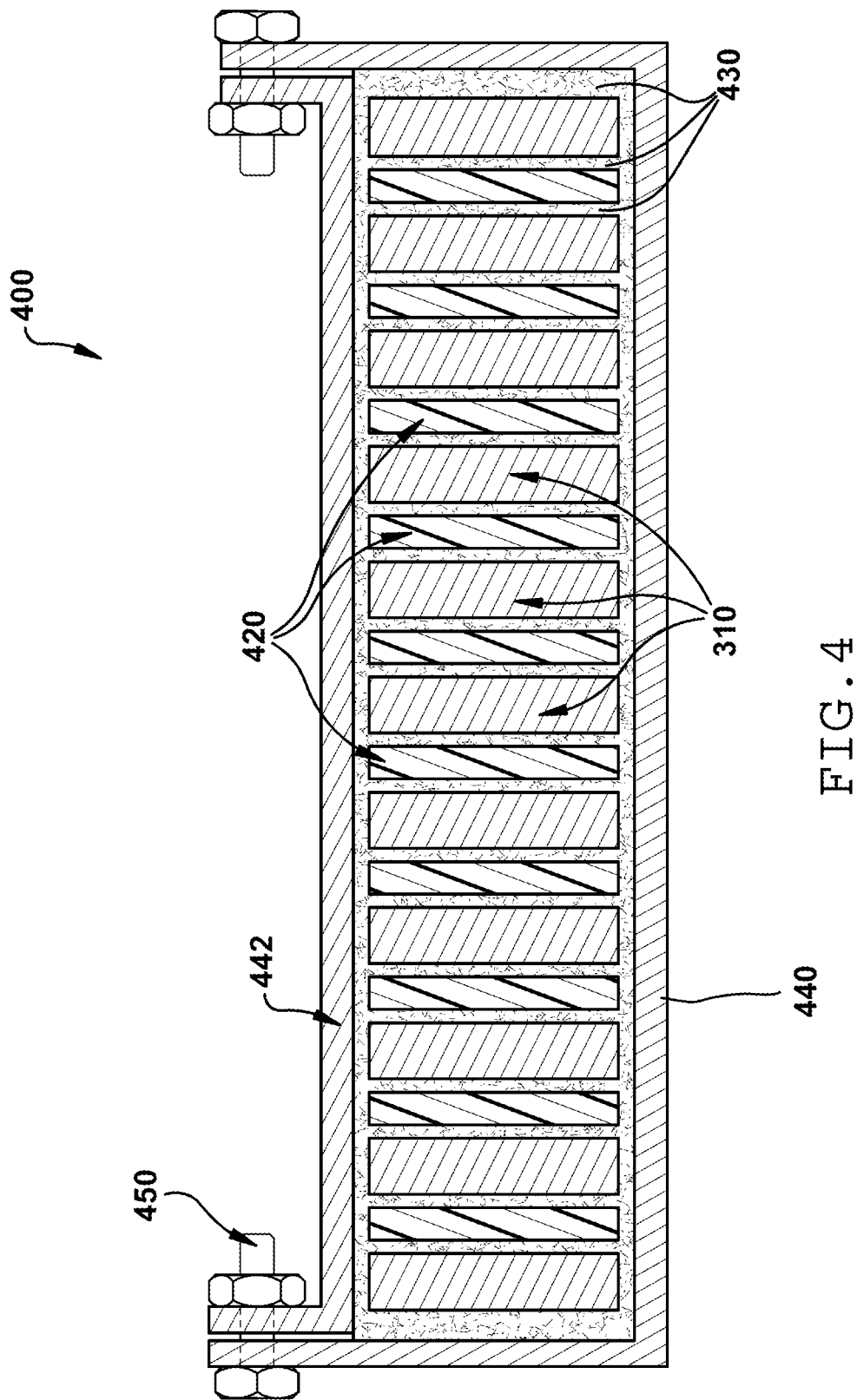
FIG. 4 is a cross-sectional illustration of an improved connection ring assembly, according to an aspect of the present invention.

FIG. 4 illustrates a cross-sectional view of a connection ring assembly 400 that includes connection rings 410, blocking 420 between adjacent connection rings 410, sacrificing material 430, first clamp element 440, second clamp element 442 and bolting mechanism 450. The blocking 420 can be comprised of a felt, felt-textolite, rubber, elastomer, fibrous material or any other suitable material. The sacrificing material 430 could be felt, felt-textolite, rubber, elastomer, fibrous material or any other suitable material. The two clamp elements 440, 442 are clamped together with a mechanical fastening system 450 (e.g., a bolt and nut arrangement). Only two bolts/nuts are shown, but it is to be understood that any suitable number of appropriate fasteners can be employed to clamp the two clamp elements 440, 442 together. The connection ring assembly 400 of the present invention, provides axial and tangential stiffness, which reduces the increasing loads problem associated with glass ties.

Figure 5:
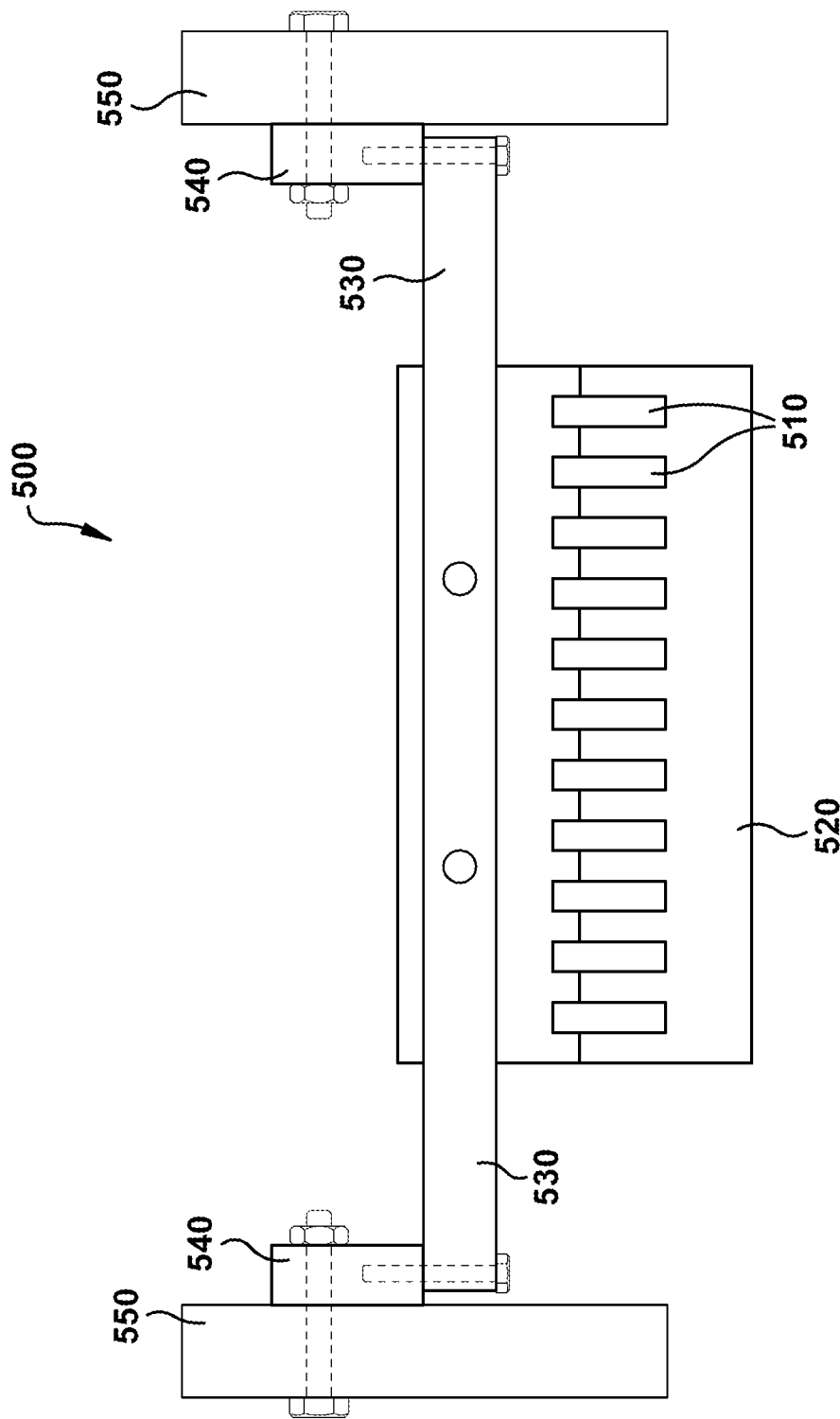
FIG. 5 illustrates a cross-sectional view of a connection ring support system, according to an aspect of the present invention.

FIG. 5 illustrates a cross-sectional view of a connection ring support system 500. The connection ring support system 500 includes primary spring bars 530 that are connected to the connection ring assembly 520, and the connection ring assembly supports the connection rings 510. In one preferred embodiment, two primary spring bars 530 are connected to the connection ring assembly 520. The primary spring bars 530 permit movement of the connection rings 510 and connection ring assembly 520 in the radial and tangential directions. In FIG. 5 the radial direction would be up or down, and the tangential direction would be in or out of the page.

The primary spring bars 530 are also connected to secondary spring bars 540. The secondary spring bars 540 may be connected to the stator frame 550 or other suitable support, and permit movement of the connection rings 510 and connection ring assembly 520 in the axial direction. In FIG. 5 the axial direction would be in the left or right direction, or illustrated by a horizontal line running across the page. The secondary spring bars 540 could be leaf springs or any other suitable mechanism for allowing axial movement. As one alternate example, the secondary spring bars 540 could be replaced with a bracket system incorporating a low friction material, such as polytetrafluoroethylene (PTFE) or Teflon® (a registered trademark of the E. I. du Pont de Nemours and Company).

Figure 6:
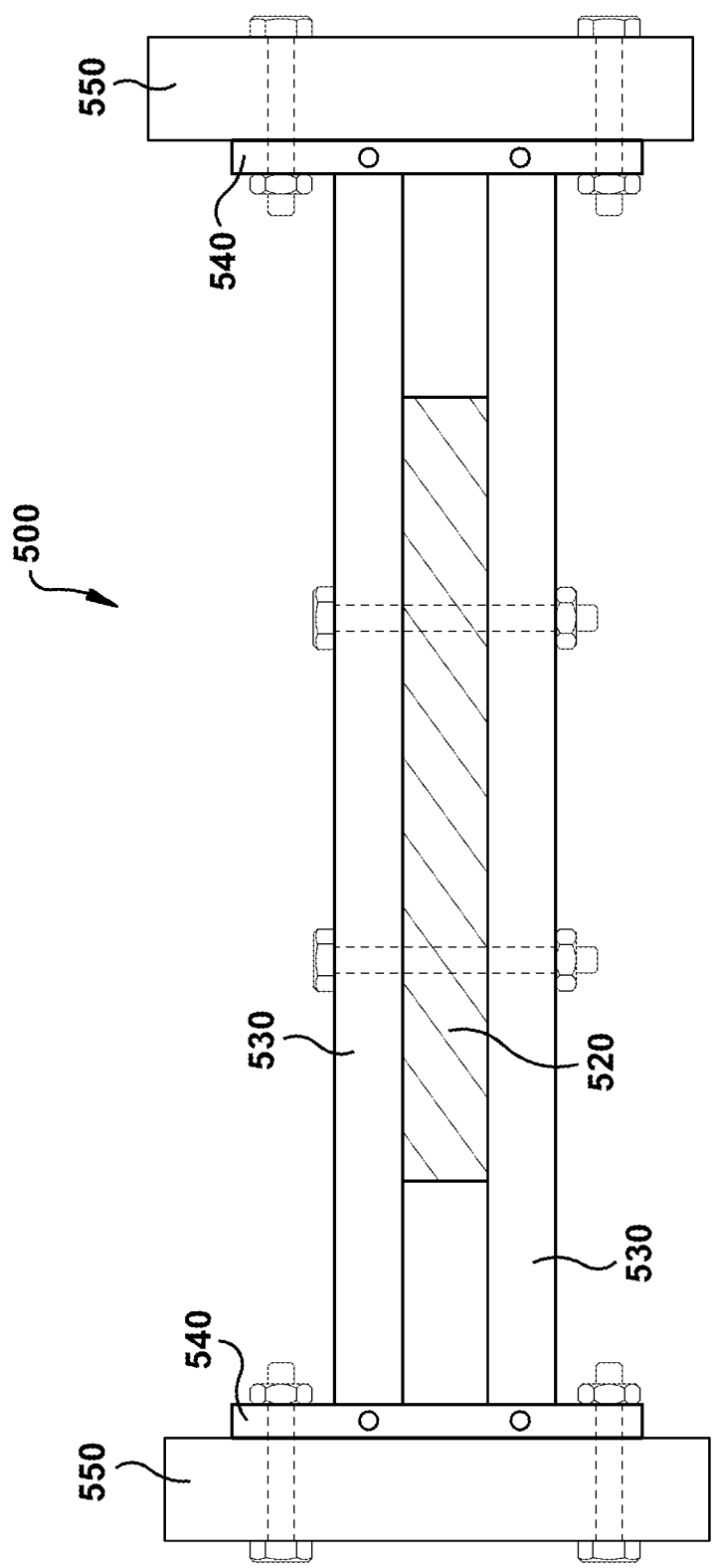
FIG. 6 illustrates a top view of a connection ring support system, according to an aspect of the present invention.

FIG. 6 illustrates a top view of the connection ring support system 500. Two primary spring bars 530 are shown attached to connection ring assembly 520. In this view, the radial direction is in or out of the page and the tangential direction would be up or down (e.g. a vertical line). The axial direction is in the left or right direction, or illustrated by a horizontal line running across the page.

FIG. 7 illustrates a cross-sectional view of a connection ring support system 700. The connection ring support system 700 includes a primary spring bar 730 that is connected to the connection ring assembly 720, and the connection ring assembly 720 supports the connection rings 710. A bracket 732 and fasteners 734 can be used to connect the primary spring bar 730 to the connection ring assembly 720. The primary spring bar 730 permits movement of the connection rings 710 and connection ring assembly 720 in the radial and tangential directions. In FIG. 7 the radial direction would be up or down (i.e., in a vertical direction), and the tangential direction would be in or out of the page.

The primary spring bar 730 is also connected to secondary spring bars 740. The secondary spring bars 740 may be connected to the stator frame 750 or other suitable support, and permit movement of the connection rings 710 and connection ring assembly 720 in the axial direction. In FIG. 7 the axial direction would be in the left or right direction, or illustrated by a horizontal line running across the page. The secondary spring bars 740 could be leaf springs or any other suitable mechanism for allowing axial movement. As one alternate example, the secondary spring bars 740 could be replaced with a bracket system incorporating a low friction material, such as polytetrafluoroethylene (PTFE) or Teflon® (a registered trademark of the E. I. du Pont de Nemours and Company).

FIG. 8 illustrates a top view of the connection ring support system 700. Primary spring bar 730 is shown attached to connection ring assembly 720. In this view, the radial direction is in or out of the page and the tangential direction would be up or down (e.g. a vertical line). The axial direction is in the left or right direction, or illustrated by a horizontal line running across the page.

Any of the connection ring support assemblies 200, 300 or 400 may be combined with the connection ring support systems 500 or 700. As envisioned by aspects of the present invention, the connection ring support assemblies 200, 300, 400 may be combined with suitable attachment brackets or flanges (not shown) to connect the connection ring support assemblies to the primary spring bars of the connection ring support systems 500, 700.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A connection ring assembly for a dynamoelectric machine comprising:
   a plurality of connection rings;
   a clamp element disposed around at least a portion of the plurality of connection rings;
   a connection ring support system comprising one or more primary spring bars connected to the connection ring assembly, the one or more primary spring bars permitting movement of the connection ring assembly in a radial direction and a tangential direction; and
   wherein the clamp element provides axial and tangential support to the plurality of connection rings.

2. The connection ring assembly of claim 1, further comprising:
   blocking material located between adjacent connection rings.

3. The connection ring assembly of claim 2, wherein the blocking material is at least one or combinations of:
   felt, felt-textolite, rubber, elastomer, and fibrous material.

4. The connection ring assembly of claim 2, further comprising:
   sacrificing material located between the plurality of connection rings and the blocking material.

5. The connection ring assembly of claim 4, wherein the sacrificing material is at least one or combinations of:
   felt, felt-textolite, rubber, elastomer, and fibrous material.

6. The connection ring assembly of claim 1, wherein the clamp element is further comprised of two generally C-shaped members clamped together with a mechanical fastening system.

7. The connection ring assembly of claim 1, wherein the clamp element is further comprised of two generally C-shaped members, each C-shaped member having flanges that are clamped together with a mechanical fastening system.

8. The connection ring assembly of claim 1, wherein the clamp element is further comprised of:
   a first clamp element;
   a second clamp element;
   wherein the first clamp element and the second clamp element are clamped together with a mechanical fastening system.

9. The connection ring assembly of claim 1, the connection ring support system further comprising:
   one or more secondary spring bars connected to the one or more primary spring bars, the one or more secondary spring bars permitting movement of the connection ring assembly in an axial direction.

10. The connection ring assembly of claim 1, wherein the one or more secondary spring bars are also connected to a stator frame of the dynamoelectric machine.

11. A connection ring assembly for a dynamoelectric machine comprising:
   a plurality of connection rings;
   a clamp element disposed around at least a portion of the plurality of connection rings;
   a connection ring support system comprising one or more primary spring bars connected to the connection ring assembly, the one or more primary spring bars permitting movement of the connection ring assembly in a radial direction and a tangential direction, one or more secondary spring bars connected to the one or more primary spring bars, the one or more secondary spring bars permitting movement of the connection ring assembly in an axial direction; and
   wherein the clamp element provides axial and tangential support to the plurality of connection rings.

12. The connection ring assembly of claim 11, further comprising:
   blocking material located between adjacent connection rings.

13. The connection ring assembly of claim 12, wherein the blocking material is at least one or combinations of:
   felt, felt-textolite, rubber, elastomer, and fibrous material.

14. The connection ring assembly of claim 13, further comprising:
   sacrificing material located between the plurality of connection rings and the blocking material.

15. The connection ring assembly of claim 14, wherein the sacrificing material is at least one or combinations of:
   felt, felt-textolite, rubber, elastomer, and fibrous material.

16. The connection ring assembly of claim 12, wherein the clamp element is further comprised of two generally C-shaped members clamped together with a mechanical fastening system.

17. The connection ring assembly of claim 12, wherein the clamp element is further comprised of two generally C-shaped members, each C-shaped member having flanges that are clamped together with a mechanical fastening system.

18. The connection ring assembly of claim 12, wherein the clamp element is further comprised of:
   a first clamp element;
   a second clamp element;
   wherein the first clamp element and the second clamp element are clamped together with a mechanical fastening system.

19. The connection ring assembly of claim 12, wherein the one or more secondary spring bars are also connected to a stator frame of the dynamoelectric machine.

* * * * *

UNITED STATES PATENT AND TRADEMARK OFFICE
CERTIFICATE OF CORRECTION

| | | |
|---|---|---|
| PATENT NO. | : 8,461,742 B2 | Page 1 of 1 |
| APPLICATION NO. | : 12/949926 | |
| DATED | : June 11, 2013 | |
| INVENTOR(S) | : Jayashankar Kn et al. | |

It is certified that error appears in the above-identified patent and that said Letters Patent is hereby corrected as shown below:

In the Drawings:

In Fig. 4, Sheet 4 of 7, delete "310" and insert -- 410 --, therefor.

In Fig. 7, Sheet 7 of 7, delete " ———— " and insert -- 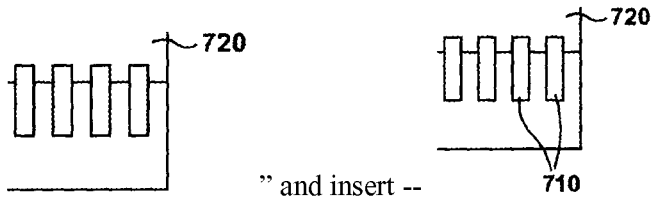 --, therefor.

In the Specifications:

In Column 2, Line 54, delete "invention;" and insert -- invention; and --, therefor.

In the Claims:

In Column 7, Line 1, in Claim 10, delete "claim 1," and insert -- claim 9, --, therefor.

In Column 8, Line 1, in Claim 14, delete "claim 13," and insert -- claim 12, --, therefor.

In Column 8, Line 8, in Claim 16, delete "claim 12," and insert -- claim 11, --, therefor.

In Column 8, Line 12, in Claim 17, delete "claim 12," and insert -- claim 11, --, therefor.

In Column 8, Line 17, in Claim 18, delete "claim 12," and insert -- claim 11, --, therefor.

In Column 8, Line 24, in Claim 19, delete "claim 12," and insert -- claim 11, --, therefor.

Signed and Sealed this
Sixth Day of August, 2013

Teresa Stanek Rea
*Acting Director of the United States Patent and Trademark Office*